US012395236B2

(12) United States Patent
Orehostky et al.

(10) Patent No.: US 12,395,236 B2
(45) Date of Patent: Aug. 19, 2025

(54) DYNAMIC ON-DEMAND CONNECTIVITY TO ADVANCED COMMUNICATION NETWORKS VIA SATELLITE

(71) Applicant: AT&T Intellectual Property I, L.P., Atlanta, GA (US)

(72) Inventors: Greg Orehostky, Morrisville, NC (US); Antonio Riccione, Spring Lake Heights, NJ (US); Kevin Jacob, Kennesaw, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 645 days.

(21) Appl. No.: 17/663,545

(22) Filed: May 16, 2022

(65) Prior Publication Data

US 2023/0370161 A1 Nov. 16, 2023

(51) Int. Cl.
*H04B 7/185* (2006.01)

(52) U.S. Cl.
CPC ....... *H04B 7/18526* (2013.01); *H04B 7/1855* (2013.01); *H04B 7/18584* (2013.01)

(58) Field of Classification Search
CPC .............. H04B 7/18526; H04B 7/1855; H04B 7/18584
See application file for complete search history.

(56) References Cited

U.S. PATENT DOCUMENTS

| 2020/0099443 A1* | 3/2020 | Ravishankar | ....... H04W 72/542 |
| 2020/0304981 A1* | 9/2020 | Neybert | .................. H04W 4/02 |
| 2021/0168031 A1 | 6/2021 | Stockert et al. | |
| 2023/0308219 A1* | 9/2023 | Chen | .................... H04L 1/0025 |

OTHER PUBLICATIONS

Sengupta, K. et al. | "New chip hides wireless messages in plain sight" by Office of Engineering Communications, Princeton University, Tuesday, Nov. 23, 2021, weblink https://ece.princeton.edu/news/new-chip-hides-wireless-messages-plain-sight, 7 pages.

* cited by examiner

*Primary Examiner* — Ricky Q Ngo
*Assistant Examiner* — Kabir U Jahangir
(74) *Attorney, Agent, or Firm* — Guntin & Gust, PLC; Mark Wilinski

(57) ABSTRACT

Dynamic, on-demand connectivity via satellite is enabled for advanced communication networks, such as, but not limited to, fifth generation (5G) communication networks and beyond. For instance, a system comprises radio equipment part of a new radio (NR) communication network that facilitates communication of data traffic between a communication device and core equipment of the NR communication network via satellite communication equipment part of a satellite communication network, wherein the radio equipment facilitates the communication using a NR communication protocol defined for the NR communication network. In one or more embodiments, the NR network comprises a 5G network and wherein the NR communication protocol comprises a 5G communication protocol.

20 Claims, 11 Drawing Sheets

DYNAMIC ON-DEMAND CONNECTIVITY TO ADVANCED COMMUNICATION NETWORKS VIA SATELLITE

TECHNICAL FIELD

This disclosure relates generally to communication networks and, more particularly, to techniques for providing dynamic, on-demand connectivity via satellite to advanced communication networks, such as, but not limited to, fifth generation (5G) communication networks and beyond.

BACKGROUND

Satellite backhaul networks can provide a means for connectivity to cellular networks in scenarios where cellular coverage is unavailable, such as rural locations and areas stricken with power outages or damage to the cellular network infrastructure do to natural disasters (e.g., storms, wildfires, earthquakes, etc.) and other events. In the later scenario, the ability to maintain connectivity to the cellular network is of critical importance for First Responders. With the evolution of wireless communication networks from second generation (2G) through fourth generation (4G) and long term evolution (LTE), satellite communications have played a critical role in providing an access network for First Responders and those supporting them. From voice services, text messages, and downloading of data, First Responders rely on these services in order to effectively perform their duties. As wireless communication networks continue to evolve into 5G and beyond, the ability to provide 5G applications and services to First Responders and commercial customers via satellite backhaul is ever increasing. However, satellite backhaul networks present unique challenges that has made the ability to provide 5G capabilities over satellite backhaul yet to be realized.

DETAILED DESCRIPTION

Figure 1:
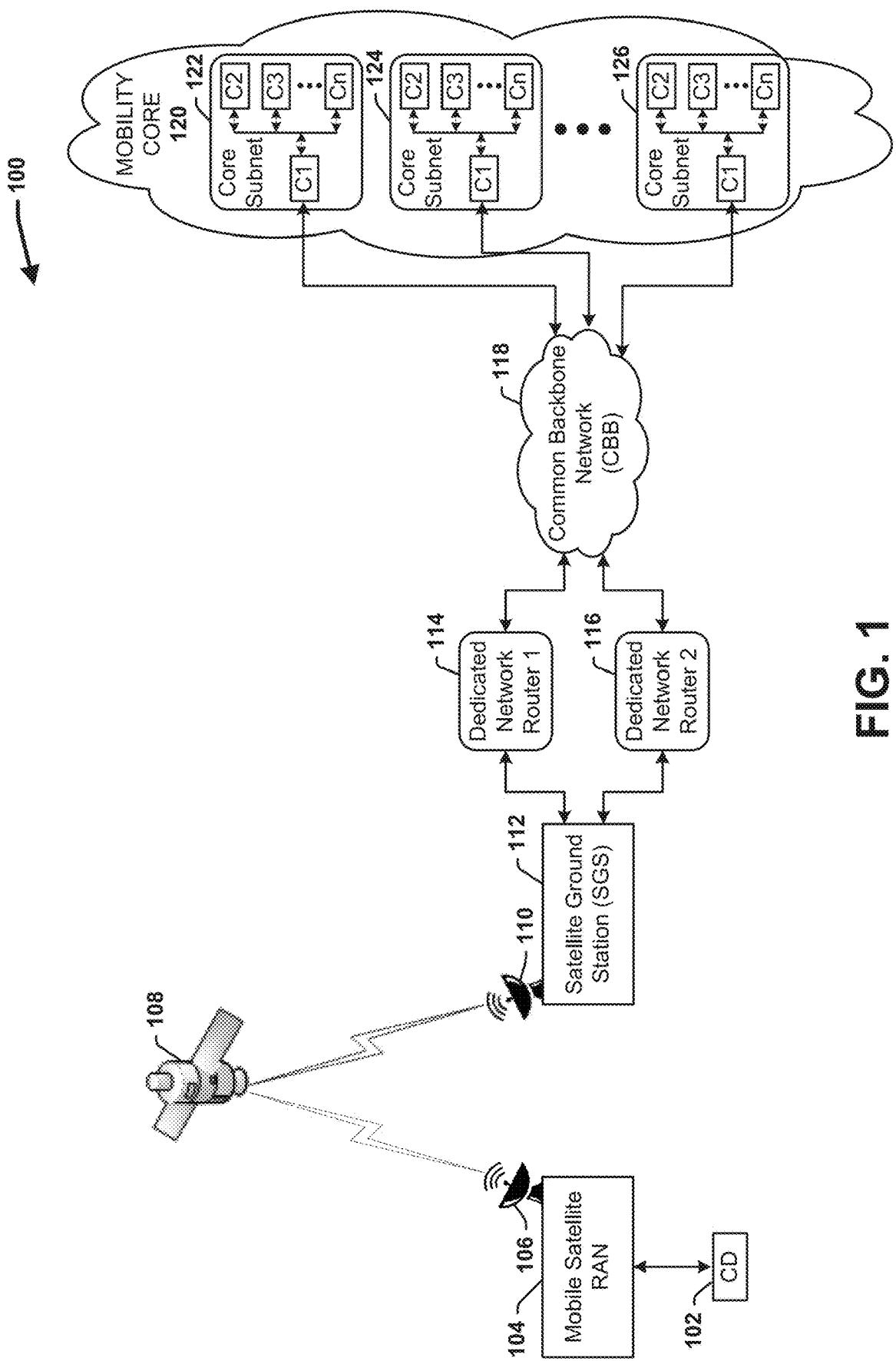
FIG. 1 illustrates an example system that provides dynamic, on-demand connectivity to advanced communication networks via satellite in accordance with various aspects and embodiments of the disclosed subject matter.

The following detailed description is merely illustrative and is not intended to limit embodiments and/or application or uses of embodiments. Generally speaking, one or more embodiments can provide dynamic, on-demand connectivity to advanced communication networks via satellite, such as, but not limited to, fifth generation (5G) communication networks and beyond. This solution allows the use of the existing satellite communication networks used with mobile satellite radio access networks (RANs) that are deployed in times of natural disasters and for major events where there is no or very limited existing cellular network coverage.

In one or more embodiments, a system is provided that provides 5G capabilities via satellite backhaul. The system comprises radio equipment part of a new radio (NR) communication network that facilitates communication of satellite data traffic between a communication device and core equipment of the NR communication network via satellite communication equipment part of a satellite communication network, wherein the radio equipment facilitates the communication using a new radio communication protocol defined for the NR communication network. To this end, the radio equipment can comprise a processor and memory that stores executable instructions that, when executed by the processor, facilitate performance of operations, comprising, determining that satellite data traffic is to be communicated between a communication device and core equipment of the NR communication network, wherein the radio equipment is part of the NR communication network, and facilitating communication of the satellite data traffic between the communication device and the core equipment via satellite communication equipment that is part of a satellite communication network, the facilitating comprising facilitating the communication using a NR communication protocol defined for the new radio communication network In various implementations, the NR communication network comprises a 5G network and the new radio communication protocol comprises a 5G communication protocol. In some embodiments, the radio equipment can also facilitate the communication using one or more additional communication protocols, including a long-term evolution (LTE) protocol and a 4G communication protocol. With these embodiments, the radio equipment can provide for switching dynamically between different wireless communication technologies, including between 5G, 4G, LTE, and future wireless communication technologies (e.g., sixth generation (6G) and beyond) based on service needs, network conditions, and communication device capabilities.

In various embodiments, radio equipment comprises first radio sub-equipment that corresponds to a mobile RAN cell cite. In this regard, the first radio equipment provides the access technology for the communication device and communicates the satellite data traffic between the communication device and the satellite communication equipment (e.g., via the satellite backhaul) in accordance with the NR communication protocol. In some embodiments, the first radio equipment comprises NR hardware and software updates that support 5G communication operations. The first radio sub-equipment can be deployed on a variety of different mobile assets, including (but not limited to), automotive vehicles (e.g., cars, trucks, vans, etc.), aerial vehicles (e.g., drones, blimps, etc.), and watercraft vessels, and other portable or mobile assets tailored to different landscapes and usage scenarios.

The radio equipment further comprises second radio sub-equipment that communicates the satellite data traffic between the satellite communication equipment and the core equipment (i.e., the cellular network mobility core). In some embodiments, the core equipment comprises a dedicated satellite mobility management entity (MME) that controls connectivity of communication devices to the core equipment via the radio equipment and the satellite communication equipment to a subgroup of authorized communication devices, such as communication devices used by First Responders. With these embodiments, the system can control usage of limited network satellite resources and bandwidth to only authorized those communication devices based on priory of need (e.g., to ensure connectivity for emergency services).

In one or more embodiments, the second radio sub-equipment comprises dedicated router devices that route the satellite data traffic between the satellite communication equipment and the dedicated satellite MME entity via a common backbone (CBB) network part of the new radio communication network in accordance with defined routing paths. The CBB network can comprise a network of router nodes, and wherein least one of the one or more router nodes comprises a routing advertisement component that advertises the defined routing paths to the dedicated router devices and one or more other routing nodes of the network of router nodes.

Various aspects described herein can relate to New Radio (NR), which can be deployed as a standalone radio access technology or as a non-standalone radio access technology assisted by another radio access technology, such as Long-Term Evolution (LTE), for example. It should be noted that although various aspects and embodiments have been described herein in the context of 5G, Universal Mobile Telecommunications System (UMTS), and/or Long-Term Evolution (LTE), or other next generation networks (e.g., 6G and so on), the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

In some embodiments, the non-limiting term radio network equipment, radio network node or simply network node, radio network device or simply network device and network equipment are used herein. These terms may be used interchangeably, and refer to any type of network node that can serve a UE and/or be connected to other network node or network element or any radio node from where user equipment receives or transmits a signal. Examples of radio network nodes are Node B, base station (BS), multi-standard radio (MSR) node such as MSR BS, gNodeB, eNode B, access point (AP) devices, network controller, radio network controller (RNC), base station controller (BSC), relay, donor node controlling relay, base transceiver station (BTS), transmission points, transmission nodes, radio resource unit (RRU), remote radio head (RRH), nodes in distributed antenna system (DAS), etc. The term radio equipment can include hardware elements, software elements, and combinations thereof.

In some embodiments, the non-limiting term communication device (or user equipment (UE), device or similar term) is used. It can refer to any type type of wired or wireless device that can communicate with a network node in a wired or wireless communication system and/or a radio network node in a cellular or mobile communication system. Examples of communication devices can include, but are not limited to, a computer (e.g., a desktop computer, a laptop computer, laptop embedded equipment (LEE), laptop mounted equipment (LME), or other type of computer), a mobile terminal, a cellular and/or smart phone, a tablet or pad (e.g., an electronic tablet or pad), an electronic notebook, an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a set-top box, an IP television (IPTV), a device to device (D2D) UE, a machine type UE or a UE capable of machine to machine (M2M) communication, a Personal Digital Assistant (PDA), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), a music or media player, speakers (e.g., powered speakers having wireless communication functionality), an appliance (e.g., a toaster, a coffee maker, a refrigerator, or an oven, or other type of appliance having wireless communication functionality), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

As used herein, "5G" can also be referred to as New Radio (NR) access, and vice versa. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Embodiments of systems and devices described herein can include one or more machine-executable components or instructions embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. These computer/machine executable components or instructions (and other described herein) can be stored in memory associated with the one or more machines. The memory can further be operatively coupled to at least one processor, such that the components can be executed by the at least one processor to perform the operations described.

In this regard, various embodiments of the disclosed subject matter are directed to a communication system that includes a network of radio equipment, satellite equipment, and core equipment. Any of the radio equipment, satellite equipment and core equipment described herein can include or be operatively coupled to at least one processor and a memory that stores executable instructions corresponding to the operations described herein that are performed by the respective radio equipment components/elements. These radio equipment components/elements can include real or virtual machines that employ the at the at least one processor to execute the instructions stored in the memory to facilitate performance of the operations described with reference to the radio equipment, the satellite equipment, and/or the core equipment. Examples of said and memory and processor as well as other suitable computer or computing-based elements, can be found with reference to FIG. 12 (e.g., processing unit 1204 and system memory 1206 respectively), and can be used in connection with implementing one or more of the systems or components shown and described in connection with FIG. 1, or other figures disclosed herein.

FIG. 1 illustrates an example system 100 that provides dynamic, on-demand connectivity to advanced communication networks via satellite in accordance with various aspects and embodiments of the disclosed subject matter. System 100 comprises a network of radio equipment part of a NR communication network (e.g., a 5G communication network, a 6G communication network and future generation communication networks) that facilitate connectivity to a cellular network mobility core 120, part of the NR commination network, via a satellite communication network (i.e, via a satellite backhaul) using a NR communication communication protocol, such as a 5G communication protocol, a 6G communication protocol and/or other future generation communication protocols. The radio equipment includes a mobile satellite RAN 104 that corresponds to a mobile cell site via which one or more communication devices (e.g., communication device (CD) 102, hereinafter CD 102) can attach to/connect with using their supported wireless communication access technology. It should be appreciated that a single communication device (i.e., CD 102) is illustrated for brevity and the number of communication device that can connect to the mobile satellite RAN 104 is unlimited. In addition, although system 100 is illustrated with a single mobile RAN 104, it should be appreciated that system 100 can include a plurality of mobile RANs 104 that may be deployed at different locations and configured to communicate with the satellite using the techniques described herein. For example, as described in greater detail infra, the mobile satellite RAN 104 can correspond to a mobile cell cite deployed on or within a mobile asset such as a truck, drone, blimp, etc. and positioned in different physical locations where terrestrial cellular network coverage is unavailable, such as rural areas and/or areas afflicted with natural disasters (e.g., hurricane distressed areas, wildfire distressed areas, etc.).

In accordance with the subject disclosure, the access technology supported/employed by the mobile satellite RAN 104 can include a NR access technology, such as 5G, 6G and future access technologies. In some embodiments, the mobile satellite RAN 104 can also support other previous generation wireless communication technologies, including 2G, 3G, 4G and LTE communication technologies. With these embodiments, the mobile satellite RAN 104 can dynamically switch between using different wireless communication access technologies (e.g., 3G, 4G, 5G, 6G and LTE) based on service/application latency and reliability needs, load, communication device capabilities, and communication device authorizations and service level agreements (SLAs). For example, if a connected communication device (e.g., CD 102) is utilizing 5G but no longer requires 5G-specific applications, that communication device can fall back to 4G/LTE using the same configuration and equipment equipped inside communication device. In this regard, once the network orbital angular momentum (OAM) channel and radio bearers are established between the communication device 102 and the mobile satellite RAN 104, the communication device can switch between operating using different wireless communication technologies using the same radio, routing, and satellite equipment.

The mobile satellite RAN 104 can include or be coupled to (e.g., via one or more wired or wireless connections) a local satellite antenna 106 that communicates satellite data traffic with a satellite 108 over a satellite link operating on a Ku band. Hereinafter, any data traffic communicated via system 100 via the satellite 108 is referred to as satellite data traffic or simily satellite traffic. The mobile satellite RAN 104 includes further includes a local satellite modem that provides the modulation and demodulation needed to transfer data to and from the local satellite antenna 106 and communication device as Internet Protocol (IP) traffic. The satellite 108 further relays the satellite traffic to remote satellite antenna 110 deployed at remote satellite ground station (SGS), hereinafter SGS 112. The SGS 112 also includes a remote satellite modem that provides the modulation and demodulation needed to transfer the satellite traffic data to and from the remote satellite antenna 110 and the mobility core 120. In this regard, the respective local and remote satellite modems, the local satellite antenna 106, the satellite 108 and the remote satellite antenna 110 can constitute the satellite communication equipment and the satellite communication network of system 100.

The NR communication network portion of system 100 further includes a pair of dedicated network routers devices, respectively identified as dedicated network router 114 (or network router 1) and dedicated network router 116 (or network router 2), a common backbone (CBB) network, hereinafter CBB 118 and a mobility core 120. The dedicated network routers 114 and 116 provide the physical data transport routing of the data traffic from the SGS station 112 to the mobility core 120 via the CBB 118.

The mobility core 120 is responsible for transporting large amounts of traffic quickly and provides interconnectivity between the transport layer elements (i.e., the satellite communication network, SGS 112, the dedicated network routers 114 and 116 and the CBB 118). The architecture, logical and/or physical network resources associated with mobility core 120 can vary depending on whether the mobility core 120 corresponds to a 5G core, a 4G/LTE core, a 3G core, or a hybrid of different types of cellular network cores, all of which are envisioned for the mobility core 120. For example, in some embodiments, the mobility core 120 corresponds to a NR mobility core (i.e., a 5G core, a 6G core, etc.) and comprises NR equipment, elements/components and configurations (e.g., NR or 5G elements and configurations). In other embodiments, the mobility core 120 can correspond to a mobility core that aggregates different different communication technologies and supports different communication technologies (e.g., 2G, 3G, 4G, LTE, 5G, 6G, etc.). With these embodiments, the mobility core 120 can include a network of different radio equipment, components and/or elements that for the different communication technologies and provide access to the different equipment and components for the different communication technologies. The radio equipment and associated components/elements can include hardware components/elements, software components/elements, and combinations thereof. Typically, next generation cellular networks are implementing substantially software defined network core elements.

The 4G/LTE core components or elements typically provides key Evolved Packet Core functions and is also referred to as the Evolved Packet Core (EPC). The 4G/LTE core components typically include the Mobile Management Entity (MME), the Serving Gateway (SGW), the Packet Network Gateway (PGW) and the Home Subscriber Server (HSS) component.

The MME is the boundary between E-UTRAN and EPC and is responsible only for the control plane. It transmits the signaling that enables connection management. The MME communicates with the eNodeB using the S1-MME interface and with the HSS via the S6a interface. The MME is responsible for Non-Access Stratum (NAS) layer signaling, user authentication and authorization, support for connecting UE to the network, setting and managing bearer, selection of PGW and SGW for a given connection, selection of a different MME when switching between eNodeB or SGSN in case of connection for 2G/3G networks, Tracking Area management, and roaming support.

The SGW is the boundary between E-UTRAN and EPC. The SGW transfers data from the eNodeB to the PGW using the S1-U (in communication with the eNodeB) and S5/S8 (in communication with the PGW) interfaces. The SGW is responsible for routing, forwarding, packet marking and buffering, user mobility management, and support for handover connections between two eNBs.

The PGW is the boundary between the EPC and the external packet network (i.e., the Internet). The PGW is responsible for assigning IP addresses to terminals, filtering/inspecting packets, supporting selected functionalities in the network and charging for their use.

The HSS is the unit that manages user profiles, subscriptions and security functions. The HSS is responsible for user authentication when trying to connect to the network and authorization of access to selected services. The HSS also stores information about the UEs location, the MME unit it is currently registered with, and the packet networks it can connect to. The HSS operates in contact with the EPC in the control plane and communicates with the MME via interface S6a.

The 5G core components or elements can vary from the 4G/EPC core elements yet provide at least some same or similar functions. In various embodiments the 5G core components comprise the User Plane Function (UPF) component, the Access and Mobility Management Function (AMF) component, the Session Management Function (SMF) component, the Authentication Server Function (AUSF) component, the Network Repository Function (NRF) component, the Network Slice Selection Function (NSSF) component, the Policy Control Function (PCF) component, and the Unified Data Management (UDM) component. The UPF controls routing and forwarding of packets between the Internet and the RAN (e.g., the mobile satellite RAN 104), packet inspection, and packet flow control in the context of policies. The AMF controls management of procedures related to registration, mobility, availability, authorization and authentication, SMS, and location. The AMF corresponds to the MME component associated with 4G/LTE core architectures and can perform same or similar functions. The SMF controls management of procedures related to PDU sessions and their continuations, IP address allocation, roaming, data collection for charging. The AUSF controls 5G network access authentication for UEs. The NRF supports for the "Service Discovery" function—recognition of the network environment within 5GS. The NSSF controls forming and/or selecting a slice/virtual network "Network Slice" for UE needs. The PCF controls management of "policies" that define the behavior of network elements. The UDM managing subscriber data, subscriptions and SMS.

In the embodiment shown, the mobility core 120 comprises a plurality of different core sub-networks (core subnets), respectively identified as core subnet 122, core subnet 124 and core subnet 126. It should be appreciated that three core subnets are illustrated for sake of brevity and that number of core subnets can include more or less than three. The core subnets can respectively comprise one or more interconnected core components, respectively identified as component 1 (C1), component 2 (C2), component 3 (C3) and component n (Cn), wherein n represents any number.

These core components can include one or more of the various core components elements described above with reference to the 4G/LTE and 5G core architectures and/or additionally or alternative core components deployed in next generation core architectures. For example, these core components can include but are not limited to, one or more of: MME components, SGW components, PGW components, HSS components, UPF components, AMF components, SMF components, AUSF components, NRF components, NSSF components, PCF components, and UDM.

In various embodiments, each of the core subnets can be tailored to handle different types of traffic for the network. For example, the different types of traffic can vary with respect to network communication technology (e.g., 3G, 4G, LTE, 5G, 6G, etc.), network source/location, being satellite traffic or terrestrial traffic, communication device type, and so on. In some embodiments, the core subnets can comprise one or more dedicated core subnets for satellite data traffic. For example, in some embodiments, the core subnets can comprise a first dedicated core subnet for 5G satellite traffic, a second dedicated core subnet for 4G satellite traffic, a third dedicated core subnet for 3G satellite traffic, a fourth dedicated core subnet for LTE satellite traffic, and so on. In accordance with these embodiments, the dedicated router devices (e.g., dedicated router device 114 and dedicated router device 116) can correspond to physical router devices that are configured to route the satellite data traffic to the corresponding core subnet. For example, route 5G satellite traffic to the dedicated 5G core subnet, router 3G satellite traffic to the 3G core subnet and so on.

In some embodiments, the satellite data traffic can further be subdivided into subgroups of satellite data traffic based on the type of communication device. In particular, in accordance with various embodiments of the disclosed subject matter, these subgroups can include communication devices associated with First Responders and communication devices associated with all other commercial customers. The mobility core 120 can further comprise dedicated core resources for handling the First Responder satellite 5G traffic.

For example, in some implementations of these embodiments, the mobility core 120 can comprise a dedicated core subnet for First Responder 5G satellite traffic and another dedicated core subnet for all other commercial subscriber 5G satellite traffic, referred to hereinafter as business as usual (BAU) traffic. With these embodiments, the mobility core 120 can comprise a dedicated set of network core resources configured to handle only 5G satellite traffic for First Responders, ensuring these entities have sufficient priority of network resource distribution to perform their duties in times of need (e.g., natural disaster relief). The First Responder clients can thus comprise an authorized subgroup of communication devices/subscribers whose traffic is routed to the First Responder 5G satellite core subnet. With these embodiments, one or more components (e.g., C1) of the dedicated core subnet for the First Responder satellite 5G traffic can control connectivity to the 5G First Responder 5G satellite core subnet based on authorization/authentication information associated with the 5G satellite traffic identifying or indicating the 5G satellite traffic is associated with an authorized First Responder communication device/subscriber. This authorization/authentication information can be associated with a communication device identifier for the First Subscriber communication devices, a subscriber identify module (SIM) card number associated with the for the First Subscriber communication devices, or the like (e.g., controlling 5G satellite access to those subscribers who have the authorized devices, SIM cards, etc.).

In the embodiment shown, the core component that controls connectivity to the mobility core 120 from the CBB comprises the C1 component for the respective core subnets. For example, in the embodiment shown, the first component (C1) associated with each core subnet corresponds to the first core network component (or core network node) to which the traffic is routed from the CBB 118. In accordance with some embodiments, this first component (C1) can correspond to a MME component and/or an AMF component. With these embodiments, the dedicated router devices 114 and 116 correspond to physical router devices that are configured to route the network traffic to the corresponding MME/AMF component that handles a defined type of traffic. In particular, as described above, in some embodiments, each core subnet can be configured to handle a different grouping of traffic. With this configuration, the C1 component can correspond to an MME/AMF that controls connectivity of the respective types of traffic to the mobility core 120. In this regard, as applied to satellite traffic, the MMEs (i.e., one or more of the C1 components) can correspond to a dedicated MME for First Responder 5G satellite traffic.

Figure 2:
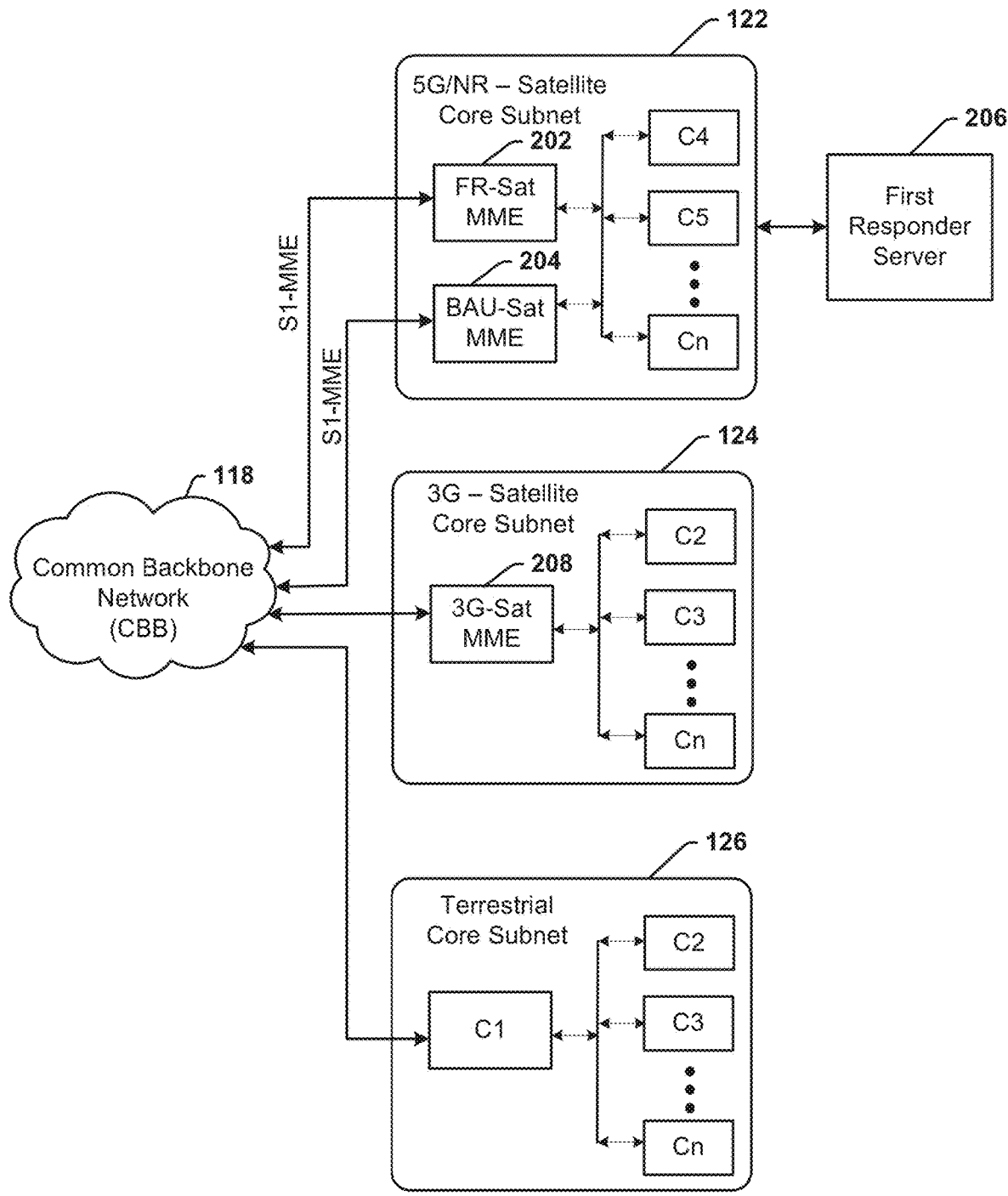
FIG. 2 presents an example deployment configuration for the mobility core in accordance with one or more embodiments of the disclosed subject matter.

Additionally, or alternatively, a single core subnet can comprise two or more dedicated MMEs configured to handle different subgroups of traffic types, as illustrated in FIG. 2.

FIG. 2 presents an example deployment configuration for the mobility core 120 in accordance with one or more embodiments of the disclosed subject matter. In accordance with this embodiment, core subnet 122 corresponds to a 5G/NR satellite core subnet configured to handle all 5G/NR satellite traffic. Core subnet 124 corresponds to a 3G satellite core subnet configured to handle all 3G satellite traffic, and core subnet 126 corresponds to another core subnet configured to handle other terrestrial data traffic. The 5G/NR satellite core subnet (i.e., core subnet 122) comprises two MME, one dedicated to First Responder 5G satellite traffic (FR-sat MME 202) and another dedicated to BAU 5G satellite traffic (BAU-Sat MME 204). With these embodiments, 5G satellite traffic corresponding to First Responder communication devices/subscribers is routed from the CBB 118 over the S1 interface to the First Responder 5G satellite MME (FR-sat MME 202) and all other BAU 5G satellite traffic is routed from the CBB 118 over the S1 interface to the BAU-Sat MME 204. The FR-sat MME 202 can further control connectivity of the corresponding satellite traffic to the First Responder Server 206. In this example, the 3G satellite core subnet (core subnet 124) also comprises a dedicated 3G satellite MME 208 configured to handle only 3G satellite traffic.

Figure 3:
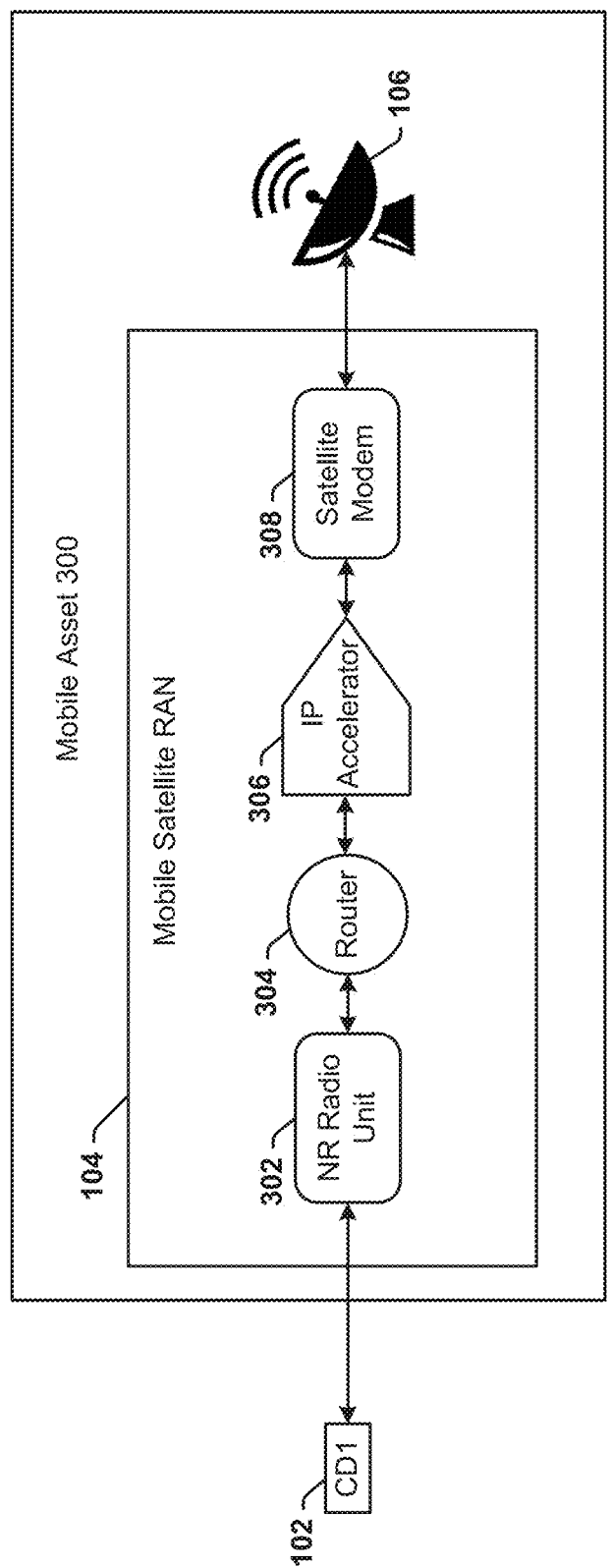
FIG. 3 presents an example mobile satellite radio access network (RAN) operable with advanced communication networks in accordance with various aspects and embodiments of the disclosed subject matter.

FIG. 3 presents an example mobile satellite RAN 104 operable with advanced communication networks in accordance with various aspects and embodiments of the disclosed subject matter. FIG. 3 illustrates some additional details of the mobile satellite RAN 104 presented in FIG. 1. Repetitive description of like elements employed in respective embodiments is omitted for sake of brevity. The mobile satellite RAN 104 includes a NR radio unit 302 that provides wireless communication connectivity to communication devices (e.g., CD 102). This NR radio unit corresponds to different radio unit compared to that used in 4G/LTE and previous mobile satellite RANs. In particular, the NR radio unit 302 can comprise new hardware and software components that are specifically configured to perform NR communication protocols, such as 5G communication protocols, 6G communication protocols, in association with communicating data traffic with communication devices (e.g., CD 102) attached thereto. In this regard, the NR radio unit 302 can support 5G wireless communication technologies.

The mobile satellite RAN 104 further includes a router 304, an IP accelerator 306, and a local satellite modem 308. These hardware components are connected to one another via wired connections. In this regard, the mobile satellite RAN 104 can correspond to a mobile 5G eNB with the addition of the IP accelerator 306. The IP accelerator 306 modifies the data traffic stream to account for the large travel distance between the satellite 108 and the respective satellite modems over which the traffic streams travel. This distance, (e.g., thousands of miles) can create significantly high latency/delay without modification of the data traffic by the IP accelerator 306. In this regard, the IP accelerator compresses the IP data traffic stream to account for this distance. The satellite modem 308 provides the modulation and demodulation needed to transfer data to and from the local satellite antenna 106 and communication device as Internet Protocol (IP) traffic. The satellite modem 308 is further connected to the local satellite antenna 106. Traffic flows from the CD 102, to the NR radio unit 302, to the router 304, the IP accelerator, and through the satellite modem 308 to the local satellite antenna 106 where it is then transmitted to the satellite 108. In some embodiments, the router 304 also correspond to a new NR satellite router with updated hardware and software components providing NR capabilities. For example, the router 304 can comprise an additional VLAN for the 5G NR bearer and IP connectivity to the NR core, a NR baseband unit and a NR controller.

As illustrated in FIG. 3, the mobile satellite RAN 104 and the local satellite antenna 106 can be deployed on or withing a mobile asset 300. The type of the mobile asset can vary, and can include but is not limited to, automotive vehicles (e.g., cars, trucks, vans, etc.), aerial vehicles (e.g., drones, blimps, etc.), and watercraft vessels, and other portable or mobile assets tailored to different landscapes and usage scenarios.

Figure 4:
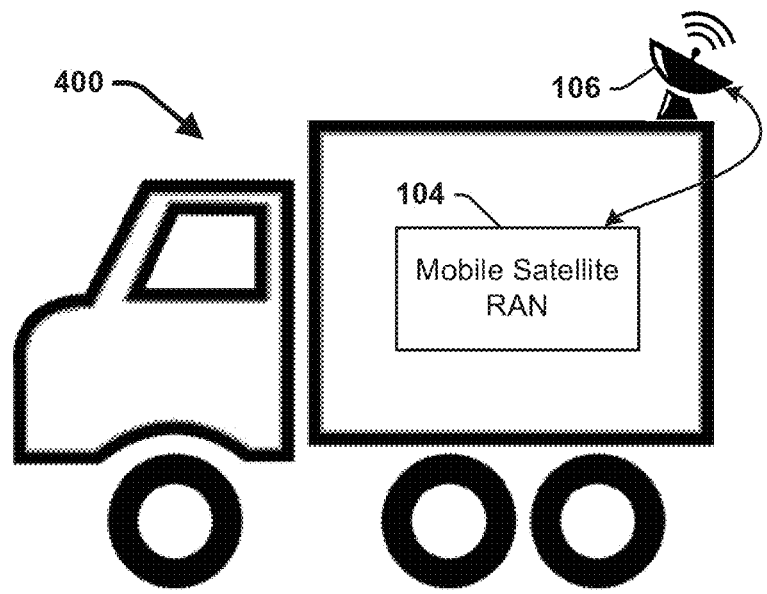
FIG. 4 illustrates an example vehicle deployment of a mobile satellite RAN operable with advanced communication networks in accordance with various aspects and embodiments of the disclosed subject matter.

FIG. 4 illustrates an example vehicle deployment of mobile satellite RAN 104 operable with advanced communication networks in accordance with various aspects and embodiments of the disclosed subject matter. In this example deployment scenario, the mobile asset comprise a truck 400 with an enclosed body/bed. The entirety of the mobile satellite RAN 104 can be deployed inside the enclosed body/bed of the truck 400. In this regard, the truck can house the NR radio, IP transport, and satellite hardware equipment that acts as a mobile cell site. The local satellite antenna 106 can further be positioned outside the truck on the roof of the truck and connected to the mobile satellite RAN 104 via a wired connection. The satellite antenna installed on the roof needs to be positioned in such a way that it has a clear line-of-sight to the satellite signal in which it is trying to acquire from the satellite 108. This requires orienting the truck so that the link can be established in order to transmit data to and from users once they have accessed the mobile satellite RAN 104.

Figure 5:
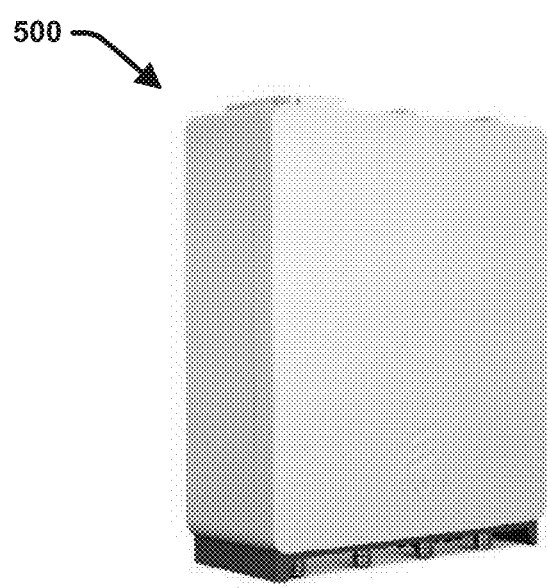
FIG. 5 illustrates an example satellite NR radio unit operable with advanced communication networks in accordance with various aspects and embodiments of the disclosed subject matter.

FIG. 5 illustrates an example satellite NR radio unit 500 operable with advanced communication networks in accordance with various aspects and embodiments of the disclosed subject matter. In one or more embodiments, the NR unit 302 corresponds to NR unit 500. In this regard, hardware upgrades were needed for the radio to support 5G NR. With LTE, the radio type remained from 3G where it was slotted into the rack inside the satellite asset's RBS. With 5G operations requiring a radio supporting NR capabilities, the radios needed to be replaced with a mountable design that can be installed on the rack itself or the wall inside the shelter of the mobile asset. This new radio design required testing over satellite to prove its capabilities can perform optimally over satellite backhaul before being adopted and installed in all assets. NR unit 500 comprises this newer form factor.

Figure 6:
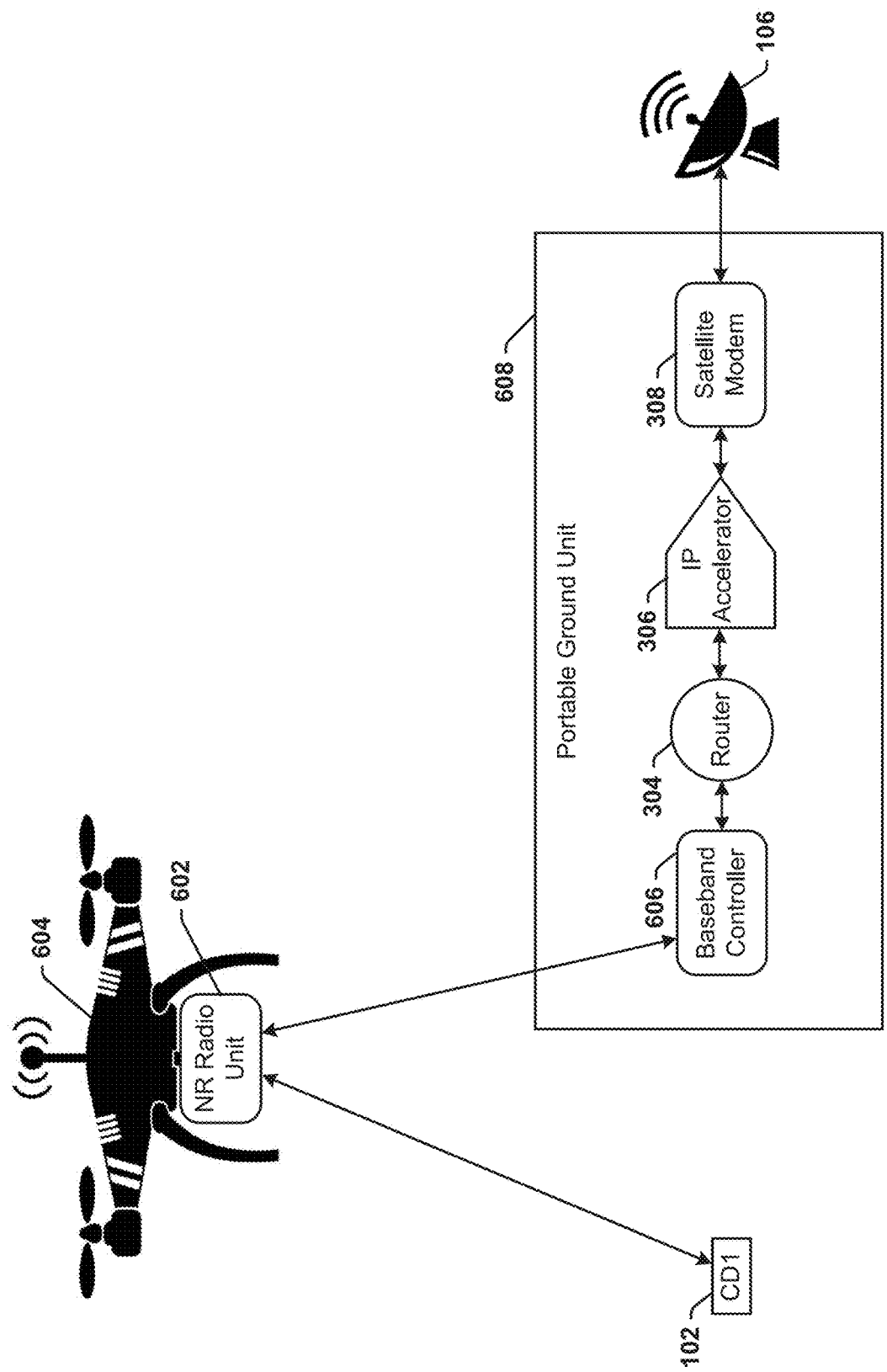
FIG. 6 illustrates an example drone deployment of a mobile satellite RAN operable with advanced communication networks in accordance with various aspects and embodiments of the disclosed subject matter.

FIG. 6 illustrates an example drone deployment of a mobile satellite RAN operable with advanced communication networks in accordance with various aspects and embodiments of the disclosed subject matter. In accordance with these embodiments, the mobile satellite RAN can include a drone 604 which houses the radio unit, NR radio unit 602, and a portable ground unit 608. The NR radio unit 602 can correspond to NR unit 303, NR unite 500 yet slightly modified to include the baseband controller 606 in the portable ground unit 608. The NR radio unit 602 can also comprise a smaller and lighter form factor relative to NR unit 500 to enable efficient attachment to the drone 602.

Providing 5G connectivity over satellite via flying assets (e.g., drones and other flying assets such as blimps) creates even more flexibility and increases the coverage footprint. For example, First Responders in a coastal area that's just been devastated by a hurricane can now access the 5G network from the drone hovering hundreds of feet in the sky. This enlarges coverage for responders spread across a larger area, while covering areas that can't be accessed by vehicle due to fallen debris, collapsed bridges, and difficult landscapes. Communication devices connected on either 4G or 5G will remain with its signal range of the drone. This allows for being connected over extended distances over inaccessible terrain. These flying assets can be deployed at high altitudes directly over wildfires where they wouldn't be impacted by the fire. They can also provide coverage over flooded areas, providing safe areas for the launch site. When higher altitudes are required for coverage to serve more of the population and surrounding area, the drones can be replaced with flying blimps that can be deployed at higher altitudes and remain in the air for longer periods of time. These flying assets can comprise changes in payloads with different radio and antenna types to support the requirements for 5G and the mission of the asset.

Figure 7:
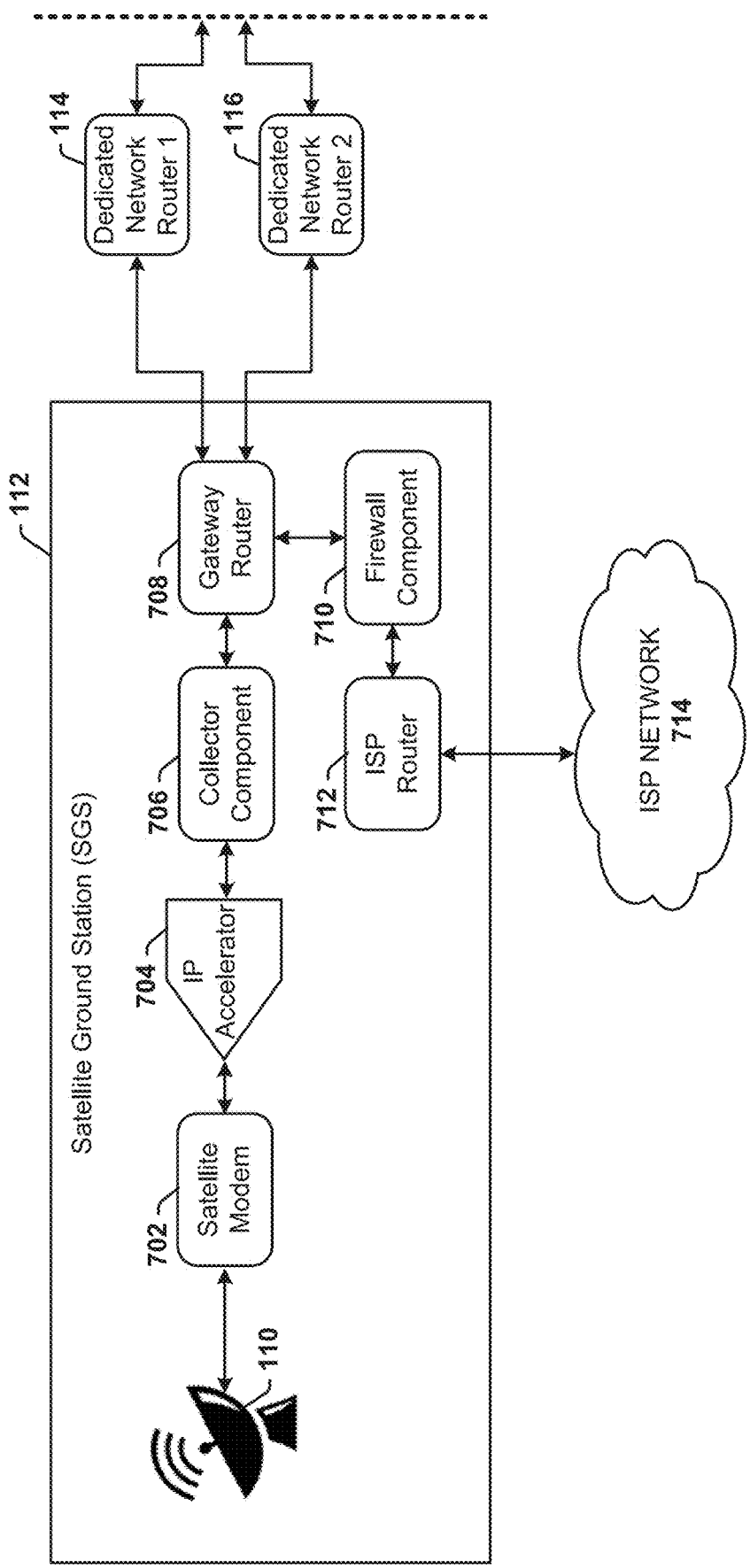
FIG. 7 illustrates an example satellite ground station (SGS) in accordance with various aspects and embodiments of the disclosed subject matter.

FIG. 7 illustrates an example SGS 112 in accordance with various aspects and embodiments of the disclosed subject matter. FIG. 7 illustrates some additional details of the SGS presented in FIG. 1. Repetitive description of like elements employed in respective embodiments is omitted for sake of brevity. The SGS includes the remote satellite antenna 110, a satellite modem 702, an IP accelerator 704, a collector component 707, a gateway router 708, a firewall component 710 and an ISP router 712. The remote satellite modem 702 provides the modulation and demodulation needed to transfer the satellite traffic data to and from the remote satellite antenna 110 and the mobility core 120. The IP accelerator 704 can perform same or similar IP traffic compression (for outgoing traffic to the satellite antenna 110) and decompression (for incoming traffic received from the satellite antenna 110) described with IP accelerator 306. The collector component 706 can further collect and all incoming and outgoing satellite traffic for different deployed satellite mobile assets deployed at different locations around the world.

The gateway router 708 routes the satellite traffic between the remote satellite antenna 110 and the mobility core 120 via the dedicated network router 114 and/or the dedicated network router 116. In some embodiments, the respective dedicated routers can be configured to handle different types of satellite traffic and the gateway router 708 can be configured to route the corresponding traffic to the appropriate router accordingly. For example, in one or more embodiments, the dedicated network router 114 can be configured to handle First Responder satellite traffic and the dedicated network router 116 can be configured to handle all other commercial, BAU satellite traffic. In another example, one of the dedicated routers can be configured to handle NR/5G satellite traffic and the other can be configured to handle 4G, LTE, 3G and 2G satellite traffic.

In some implementations, the satellite traffic may additionally or alternatively be routed from the satellite antenna 110 to an external Internet service provider (ISP) network 714. With these embodiments, the gateway router 708 can forward the appropriate satellite traffic to the ISP router 712 which connects the ISP network. Any satellite traffic flowing to the ISP network may also be processed by the firewall component 710 to perform firewall filtering of the incoming and outgoing traffic according to defined firewall traffic policies. This ISP traffic flow is typically only used for the mobile satellite asset deployment team and traffic flowing along this route can be specifically originated from an authorized subset of communication devices associated with the deployment team.

Figure 8:
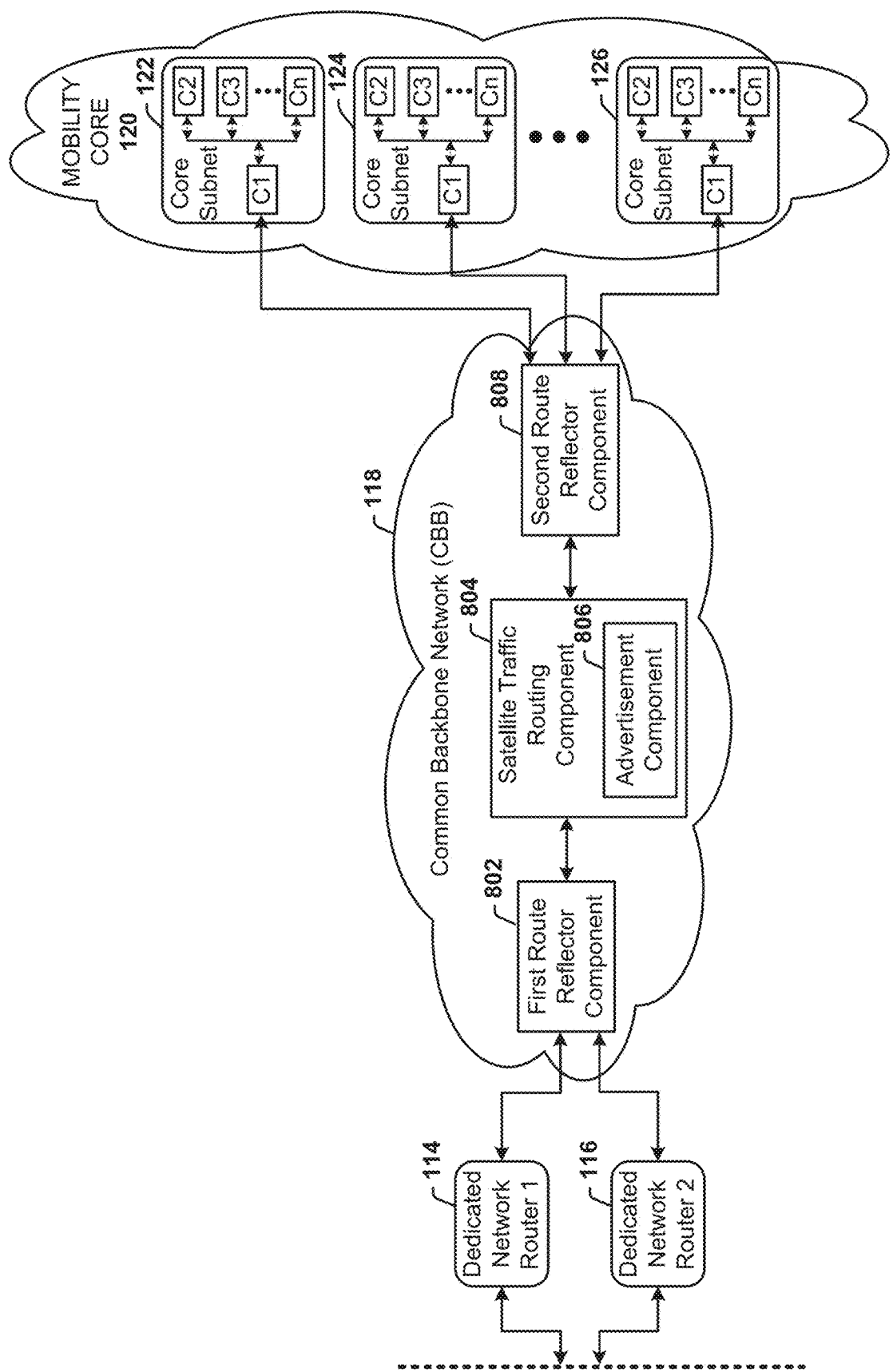
FIG. 8 illustrates an example common backbone network (CBB) that facilitates dynamic, on-demand connectivity to advanced communication networks via satellite in accordance with various aspects and embodiments of the disclosed subject matter.

FIG. 8 illustrates an example CBB 118 that facilitates dynamic, on-demand connectivity to advanced communication networks via satellite in accordance with various aspects and embodiments of the disclosed subject matter. FIG. 8 provides additional details of the CBB in accordance with various aspects and embodiments of the disclosed subject matter. Repetitive description of like elements employed in respective embodiments is omitted for sake of brevity.

The CBB 118 can comprise a plurality of interconnected router components that perform routing and transport functions for network traffic communicated between the dedicated network routers 114 and 116 and the mobility core 120. These router components include first router reflector component 802, satellite traffic routing component 804 and second router reflector component 808. These routing components can respectively correspond to real (i.e., physical) or virtual router nodes of the communication network that perform routing of the data traffic to and from the appropriate core network elements in accordance with defined routing paths for different types of traffic. In particular, as described with reference to FIGS. 1 and 2, in some embodiments, the CBB router nodes can be configured to route all satellite data traffic to and from a core subnet and/or core component (e.g., an MME) dedicated for satellite traffic. In another embodiment, CBB router nodes can be configured to route first satellite data traffic to and from a first core subnet and/or first core C1 component (e.g., a first MME) dedicated for a first subgroup of satellite traffic and configured to route second satellite data traffic to and from a second core subnet and/or second core C1 component (e.g., a second MME) dedicated for a first subgroup of satellite traffic. In some implementations of these embodiments, the first subgroup can comprise First Responder satellite traffic and the second subgroup can comprise BAU satellite traffic. Additionally, or alternatively, the first subgroup can comprise NR satellite traffic and the second subgroup can comprise a different wireless communication technology type of traffic (e.g., 2G, 3G, 4G, or LTE).

The specific routes identifying the respective core subnets and/or C1 components to which for each of the different types of traffic are to be routed, must be advertised to the dedicated network router devices 114 and 116 and the corresponding core elements to enable connectivity between the respective nodes for incoming and outgoing traffic. To facilitate the satellite routing component 804 can include an advertisement component 806 that receive routing update information from the mobility core 120 identifying the defined routing paths for the different types or subgroups of traffic. In particular, with respect to NR satellite traffic, the routing path information can identify the respective dedicated 5G core elements to and from which the NR satellite traffic is to be routed to enable 5G connectivity to the core. In various embodiments, all satellite traffic can be routed through the satellite traffic routing component 804 via the first router reflector component 802 and the second router reflector component 808. The advertisement component 806 can further advertise the new routing information for the NR satellite traffic paths to the respective dedicated routers 114 and 116 via the first route reflector component 802 (e.g., which can relay the advertised routing information between the satellite traffic routing component 804 and the respective dedicated router devices) and the second route reflector component 808 (e.g., which can relay the advertised routing information between the satellite traffic routing component 804 and corresponding dedicated satellite NR core elements).

In this regard, the transition to NR via satellite requires network connectivity enhancements to reach the mobility core 120 supporting NR. 4G/LTE connectivity to the EPC core has been in place to support LTE traffic from the satellite node. In order to achieve reachability from the satellite communication network to the NR mobility core elements via the satellite local router 304, modifications to the control plane platform and routing updates were needed so the transport from satellite to the NR core elements can follow the routing.

Figure 9:
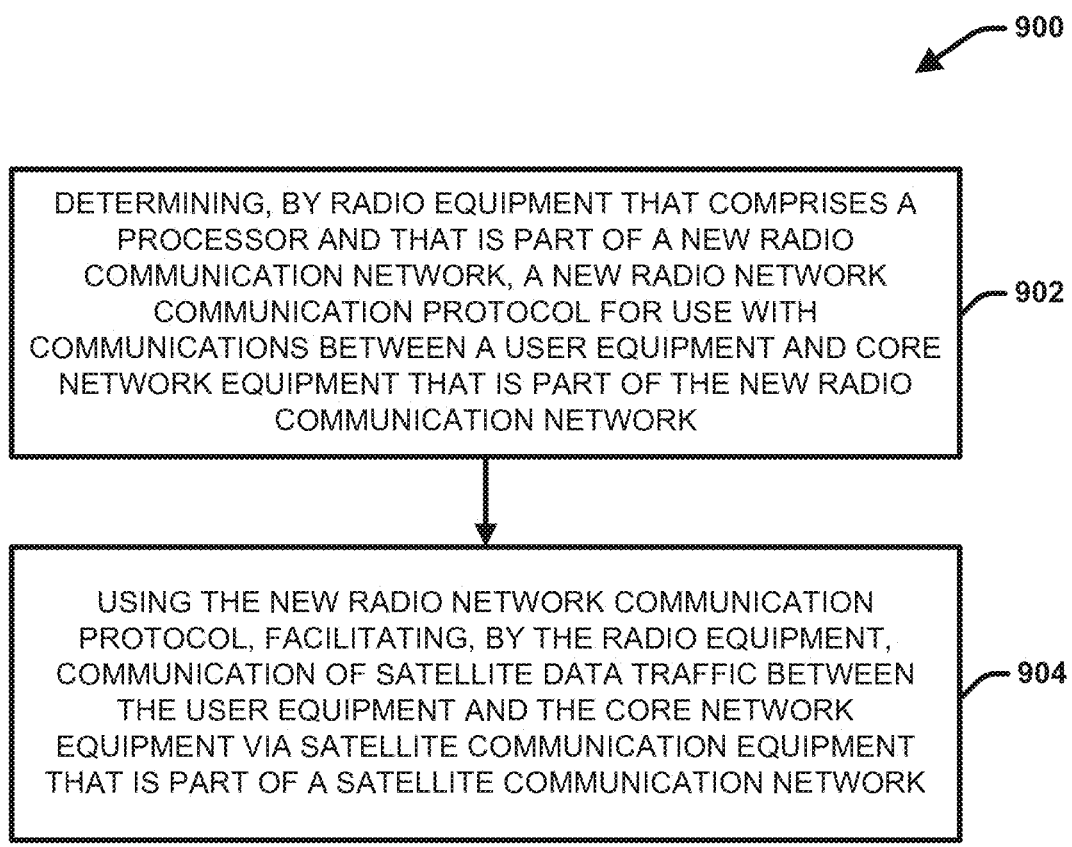
FIG. 9 illustrates a flow chart of an example method for providing dynamic, on-demand connectivity to advanced communication networks via satellite, in accordance with various aspects and embodiments of the disclosed subject matter.

FIG. 9 illustrates a flow chart of an example method 900 for providing dynamic, on-demand connectivity to advanced communication networks via satellite, in accordance with various aspects and embodiments of the disclosed subject matter. Method 900 comprises, at 902 determining by radio equipment that comprises a processor (e.g., one or more of: equipment part of the mobile satellite RAN 104 or the like, satellite SGS 112 equipment, dedicated SGS router 114, dedicated SGS router 116, and equipment part of the CBB 118) that is part of a NR communication network (e.g., a 5G network, a 6G network or another future generation network), a NR communication protocol (e.g., a 5G protocol, a 6G protocol, etc.) for use with communication between user equipment (e.g., CD 102) and core network equipment (e.g., one or more of the core subnets 122-126 and associated components C1-Cn) that is part of the NR communication network. At 904, method 900 comprises using the NR communication protocol, facilitating, by the radio equipment, communication of satellite data traffic between the UE and the core equipment via satellite communication equipment (e.g., one or more satellite modem 308, local satellite antenna 106, satellite 108, remote satellite antenna 110, and satellite modem 702) that is part of a satellite communication network.

Figure 10:
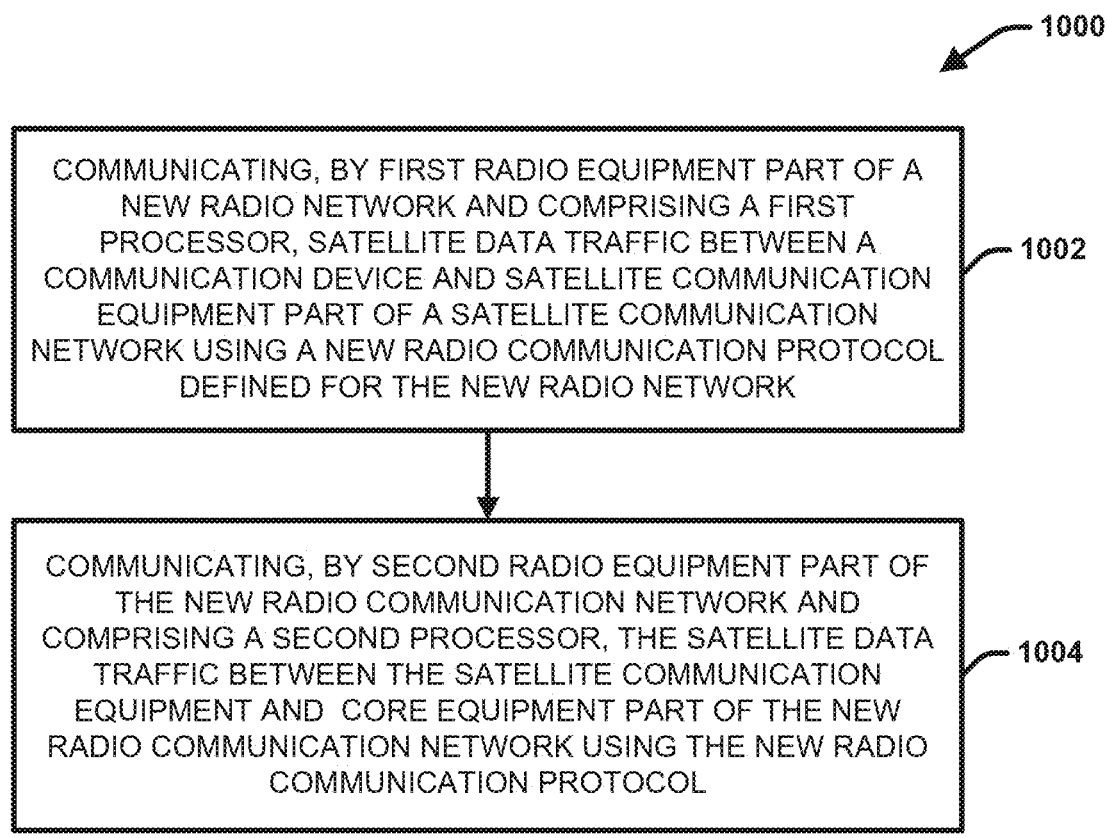
FIG. 10 illustrates a flow chart of another example method for providing dynamic, on-demand connectivity to advanced communication networks via satellite, in accordance with various aspects and embodiments of the disclosed subject matter.

FIG. 10 illustrates a flow chart of another example method 1000 for providing dynamic, on-demand connectivity to advanced communication networks via satellite, in accordance with various aspects and embodiments of the disclosed subject matter. Method 1000 comprises, at 1002 communicating, by first radio equipment (e.g., equipment part of the mobile satellite RAN 104 or the like) part of a NR communication network (e.g., 5G, 6G, etc.) and comprising a first processor, satellite data traffic between a communication device (e.g., CD 102) and satellite equipment (e.g., satellite 108) part of a satellite communication network using a NR communication protocol defined for the NR communication network (e.g., a 5G communication protocol, a 6G communication protocol, or the like). At 1004, method 1000 comprises communicating, by second radio equipment part of the NR communication network (e.g., satellite SGS 112 equipment, dedicated SGS router 114, dedicated SGS router 116, and/or equipment part of the CBB 118) and comprising a second processor, the satellite data traffic between the satellite equipment and core equipment (e.g., one or more of the core subnets 122-126 and associated components C1-Cn) of the new radio network via satellite communication equipment part of a satellite communication network.

Figure 11:
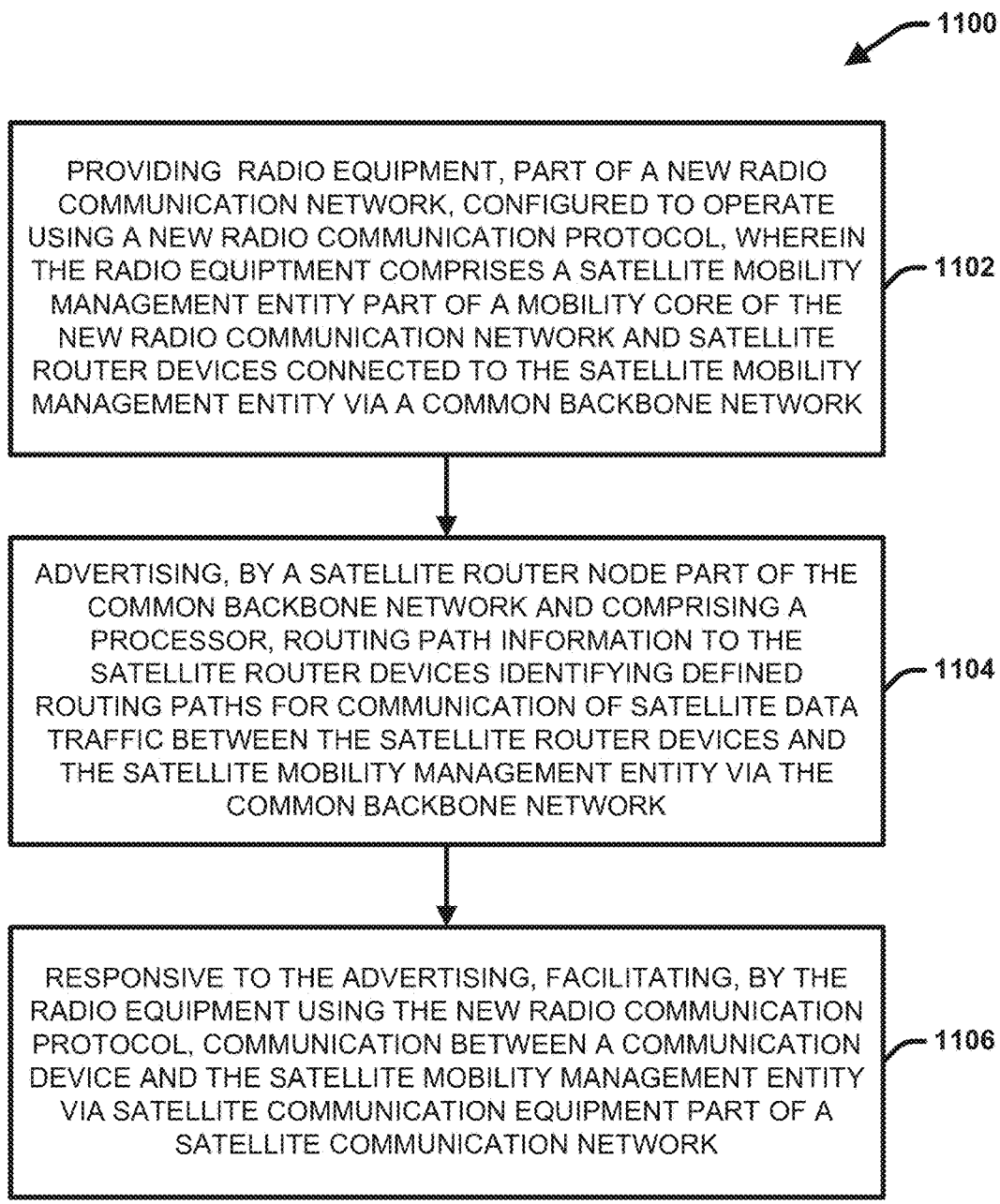
FIG. 11 illustrates a flow chart of another example method for providing dynamic, on-demand connectivity to advanced communication networks via satellite, in accordance with various aspects and embodiments of the disclosed subject matter.

FIG. 11 illustrates a flow chart of another example method 1100 for providing dynamic, on-demand connectivity to advanced communication networks via satellite, in accordance with various aspects and embodiments of the disclosed subject matter. Method 1100 comprises, at 1102, providing radio equipment, part of a NR communication network, configured to operate using a NR communication protocol (e.g., a 5G communication protocol, a 6G communication protocol, etc.), wherein the radio equipment comprises a satellite MME (e.g., FR-Sat MME 202 and/or BAU-Sat MME 204) part of a mobility core of the NR communication network and satellite router devices (e.g., dedicated network router 114 and dedicated network router 116) connected to the satellite MME via a CBB network (e.g., CBB 118). At 1104, method 1100 comprises, advertising, by a satellite router node (e.g., satellite traffic routing component 704 using advertisement component 706) part of the CBB network and comprising a processor, routing path information to the satellite router devices identifying defined routing paths for communication of satellite data traffic between the satellite router device and the satellite MME via the CBB. At 1106, method 1100 comprises, responsive to the advertising, facilitating, by the radio equipment using the NR communication protocol, communication between a communication device (e.g., CD 102) and the satellite MME via satellite communication equipment (e.g., satellite 108) part of a satellite communication network.

Figure 12:
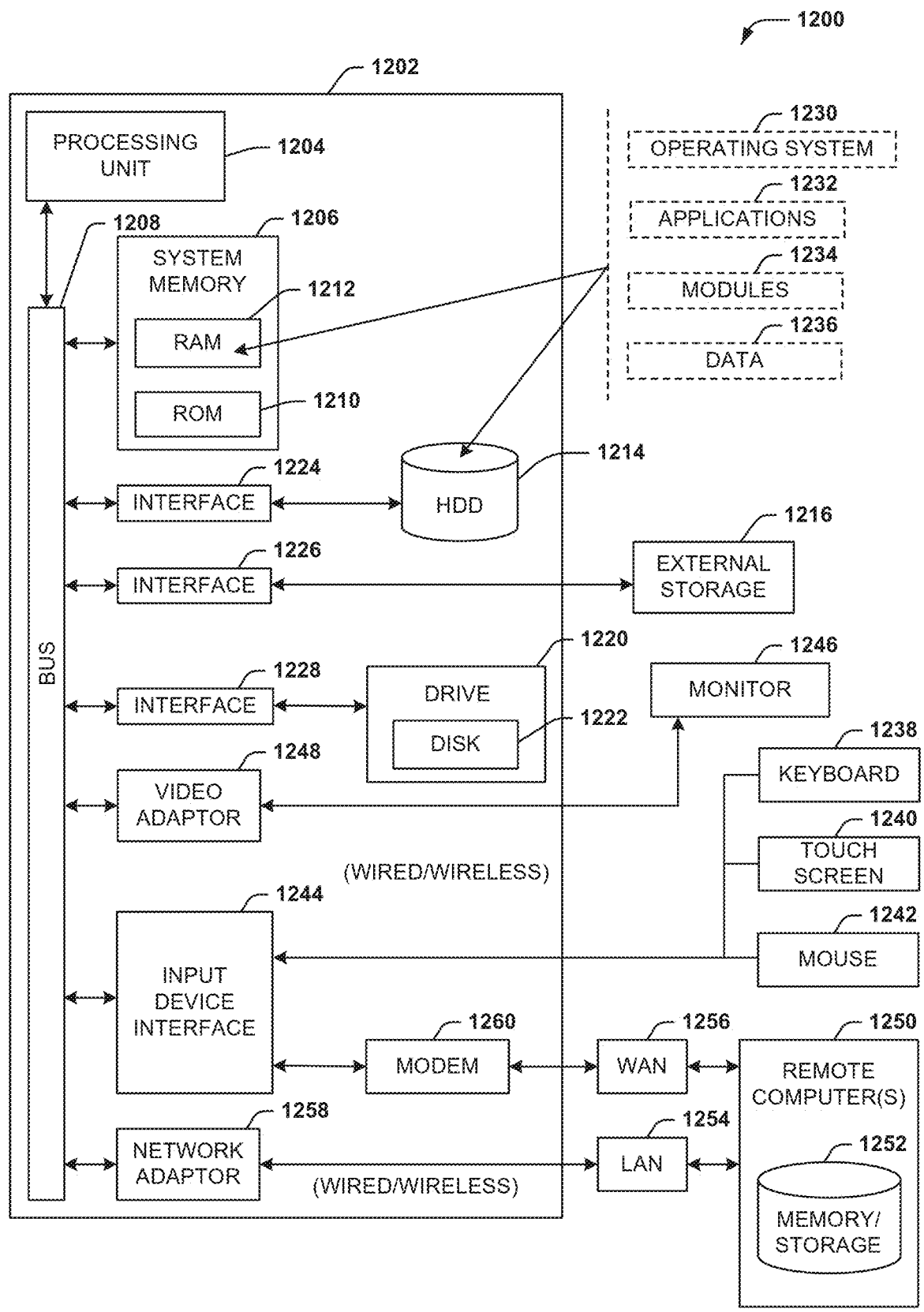
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In this regard, any of the operations described with reference to the radio equipment, the satellite equipment and the core equipment can be embodied/stored as executable instructions in a non-transitory machine-readable medium comprising the executable instructions that, when executed by a processor, facilitate performance of the operations described with respect to the corresponding equipment. For example, in one or more embodiments, a non-transitory machine-readable medium of a NR communication network can comprise executable instructions that, when executed by a processor, facilitate performance of operations, comprising: using a new NR communication protocol defined for the NR communication network; communicating, via first radio equipment that is part of a new radio communication network, satellite data traffic between a user device and satellite communication equipment that is part of a satellite communication network, the communicating; and communicating, via second radio equipment that is part of the NR communication network, the data traffic between the satellite communication equipment and core equipment that is part of the NR communication network.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

What is claimed is:

1. Radio equipment, comprising:
   a processor, and
   a memory that stores executable instructions that, when executed by the processor, facilitate performance of operations, comprising:
   determining that satellite data traffic is to be communicated between a communication device and core equipment of a new radio communication network, wherein the radio equipment is part of the new radio communication network, wherein the radio equipment comprises first radio sub-equipment and second radio sub-equipment, and wherein the core equipment comprises a dedicated satellite mobility management entity; and
   facilitating communication of the satellite data traffic between the communication device and the core equipment via satellite communication equipment that is part of a satellite communication network, the facilitating comprising facilitating the communication using a new radio communication protocol defined for the new radio communication network,
   wherein the second radio sub-equipment comprises a dedicated satellite router device that routes the satellite data traffic between the satellite communication equipment and the dedicated satellite mobility management entity via a common backbone network part of the new radio communication network in accordance with defined routing paths between the satellite communication equipment and the dedicated satellite mobility management entity.

2. The radio equipment of claim 1, wherein the new radio communication network comprises a fifth generation network that implements fifth generation network communication protocols, and wherein the new radio communication protocol comprises a fifth generation network communication protocol of the fifth generation network communication protocols.

3. The radio equipment of claim 1, wherein the facilitating further comprises facilitating the communication using an additional communication protocol other than the new radio communication protocol, and wherein the additional communication protocol comprises a long-term evolution protocol or a fourth generation network communication protocol.

4. The radio equipment of claim 1, wherein the first radio sub-equipment communicates the satellite data traffic between the communication device and the satellite communication equipment.

5. The radio equipment of claim 4, wherein the second radio sub-equipment communicates the satellite data traffic between the satellite communication equipment and the core equipment, and wherein the first radio sub-equipment is different from the second radio sub-equipment.

6. The radio equipment of claim 5, wherein the dedicated satellite mobility management entity that controls connectivity of communication devices to the core equipment via the radio equipment and the satellite communication equipment to a subgroup of authorized communication devices.

7. The radio equipment of claim 1, wherein the common backbone network comprises a network of router nodes, and wherein at least one of the network of router nodes comprises a routing advertisement component that advertises the defined routing paths to the dedicated satellite router device and to at least one other routing node of the network of router nodes other than the dedicated satellite router device.

8. The radio equipment of claim 4, wherein the first radio sub-equipment comprises a group of radio equipment that form a mobile cell site.

9. The radio equipment of claim 8, wherein the first radio sub-equipment comprises new radio hardware and new radio software that facilitates implementation of new radio communication protocols.

10. The radio equipment of claim 8, wherein the first radio sub-equipment is deployed via a mobile asset.

11. The radio equipment of claim 10, wherein the mobile asset comprises at least one of a drone or a blimp.

12. A method, comprising:
   determining, by radio equipment that comprises a processor and that is part of a new radio communication network, a new radio network communication protocol for use with communications between a user equipment and core network equipment that is part of the new radio communication network, wherein the core network equipment comprises a dedicated satellite mobility management entity; and
   using the new radio network communication protocol, facilitating, by the radio equipment, communication of satellite data traffic between the user equipment and the core network equipment via satellite communication equipment that is part of a satellite communication network, the facilitating comprising using dedicated satellite router devices to route the satellite data traffic between the satellite communication equipment and the dedicated satellite mobility management entity via router nodes included in a common backbone network of the new radio communication network in accordance with defined routing paths.

13. The method of claim 12, wherein the new radio communication network comprises a fifth generation communication network, and wherein the new radio network communication protocol comprises a fifth generation network communication protocol.

14. The method of claim 12, wherein the radio equipment comprises first radio equipment and second radio equipment, and wherein the facilitating comprises:
   communicating, by the first radio equipment, the satellite data traffic between the user equipment and the satellite communication equipment using the new radio network communication protocol; and
   communicating, by the second radio equipment, the satellite data traffic between the satellite communication equipment and the core network equipment using the new radio network communication protocol.

15. The method of claim 12, further comprising:
   facilitating, by the radio equipment, controlling, via the dedicated satellite mobility management entity, connectivity of communication devices to the core network equipment and the satellite communication equipment to a group of authorized communication devices.

16. The method of claim 12, further comprising:
   facilitating, by the radio equipment, advertising, by a first router node of the router nodes, the defined routing paths to the dedicated satellite router devices and a second routing node of the router nodes, wherein the facilitating the communication is responsive to the advertising.

17. A non-transitory machine-readable medium, comprising executable instructions that, when executed by a processor part of a new radio communication network, facilitate performance of operations, comprising:
   using a new radio network communication protocol defined for the new radio communication network:
      communicating, via first radio equipment that is part of a new radio communication network, satellite data traffic between a user device and satellite communication equipment that is part of a satellite communication network; and
      communicating, via second radio equipment that is part of the new radio communication network, the satellite data traffic between the satellite communication equipment and core equipment that is part of the new radio communication network, wherein the second radio equipment comprises a dedicated satellite router device that routes the satellite data traffic between the satellite communication equipment and a dedicated satellite mobility management entity of the core equipment via a common backbone network part of the new radio communication network in accordance with defined routing paths between the satellite communication equipment and the dedicated satellite mobility management entity.

18. The non-transitory machine-readable medium of claim 17, wherein the new radio communication network comprises a fifth generation network configured to operate using fifth generation network communication protocols, and wherein the new radio network communication protocol comprises a fifth generation network communication protocol of the fifth generation network communication protocols.

19. The non-transitory machine-readable medium of claim 17, wherein the dedicated satellite mobility management entity is utilized for first responder traffic.

20. The non-transitory machine-readable medium of claim 17, wherein the core equipment comprises another satellite mobility management entity that it utilized for commercial traffic.

* * * * *